United States Patent [19]

Brooks

[11] Patent Number: 4,731,524
[45] Date of Patent: Mar. 15, 1988

[54] REAL TIME ITEM PROCESSING APPARATUS USING A THERMAL ENCODER

[75] Inventor: Ralf M. Brooks, Waterloo, Canada

[73] Assignee: NCR Canada Ltd. - NCR Canada Ltee, Mississauga, Canada

[21] Appl. No.: 786,887

[22] Filed: Oct. 11, 1985

[51] Int. Cl.$^4$ .............................................. G06F 15/12
[52] U.S. Cl. ................................... 235/432; 235/379; 235/449; 360/1
[58] Field of Search ........................ 235/379, 432, 449; 382/7; 364/408; 360/1

[56] References Cited

U.S. PATENT DOCUMENTS

| | | | |
|---|---|---|---|
| 3,577,203 | 5/1971 | Beach | 235/449 X |
| 3,692,298 | 9/1972 | Peacock | 270/12 |
| 3,949,363 | 4/1976 | Holm | 382/7 X |
| 4,394,092 | 7/1983 | Osmera et al. | 400/120 |

OTHER PUBLICATIONS

"Smartline" by Hayosh, T. D., presented to ANSI x 9B3 on Oct. 17, 1984, by the Burroughs Corporation.

Primary Examiner—David L. Trafton
Attorney, Agent, or Firm—Wilbert Hawk, Jr.; Albert L. Sessler, Jr.; Elmer Wargo

[57] ABSTRACT

An apparatus for use in endorsing documents, like checks, in a banking system. A magnetic stripe is printed or encoded on the back of each document entering the processing system. Human readable, endorsement data is also printed next to the magnetic strip at the time that the stripe is being printed. The endorsement data is also magnetically written into a portion of the magnetic stripe during a subsequent, real-time operation to provide both machine-readable and human-readable forms of data to facilitate tracing a document's processing trail through several banks. A low-cost method of providing endorsements on checks through using the MICR encoder to print the usual monetary amount, inverting the check, re-entering the check, and using the MICR encoder to print the endorsement on the back of the check is also disclosed.

8 Claims, 7 Drawing Figures

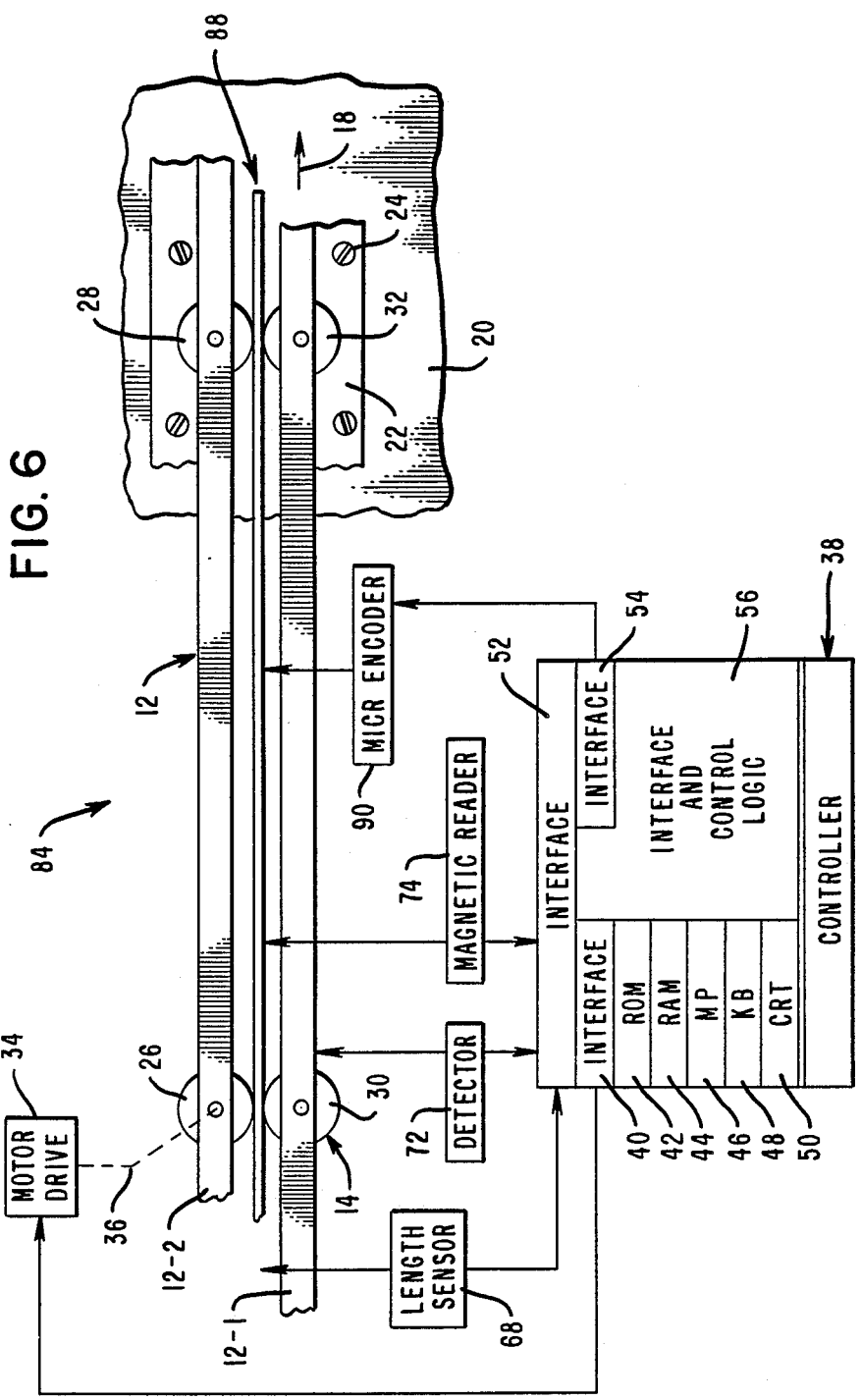

REAL TIME ITEM PROCESSING APPARATUS USING A THERMAL ENCODER

BACKGROUND OF THE INVENTION

This invention relates to the automatic processing of financial documents, and in particular, it relates to an apparatus which is used to enhance the processing procedure used in banking systems.

The automatic processing of financial documents, such as checks, has been facilitated through the use of known, machine readable codes such as E-13B, CMC-7, OCR-A, and OCR-B. Recently, the banking industry has recognized that the automatic processing of checks between institutions could be enhanced by the addition of non-MICR data on to checks. This non-MICR data tended to duplicate, to some degree, the information contained on the MICR line; however, the presence of the non-MICR data enabled processing to continue even though there was a failure associated with the MICR data. In addition, the non-MICR data generally contained more information than was present in the MICR line on the check; such additional information included, for example, the name of the financial institution of first deposit of the check. This facilitated the processing of rejected items or checks, for example. The primary, known, non-MICR enhancement technique which has been considered employs bar codes which are printed in fluorescent ink; U.S. Pat. No. 4,408,121 employs such a technique. Generally, the bar codes appear on the backs of the financial documents and are limited, generally, to printing a unique document identification number on each document when received at a bank. The bar codes can be used in the processing of documents for such operations as processing return items, processing reject items, and performing adjustment procedures.

When a check is returned due to insufficient funds, it is necessary to retrace the processing trail which the check took in getting to the final payee bank. This retracing of the processing of the check is generally accomplished by manually viewing the endorsements on the back of the check. The endorsements are placed on the back of a check by each bank which processes the check, and very often, these endorsements overlap one another and are difficult to read. This generally necessitates manual reading of the endorsements to find out who processed the check and this is an expensive and time consuming operation.

Another newer method of handling the endorsements on checks involves the use of a bar or stripe of magnetic material which is positioned on the front of the checks in a location which is away from the line on which the MICR data or printing is present i.e., the "MICR Clear Band". This bar or stripe of magnetic material is printed on the checks at the time when the check itself is printed. The various endorsements made by the banks in the processing trail are magnetically written in the bar or stripe of magnetic material. This magnetic stripe enables a lot more information to be recorded on the documents to facilitate the inter-institutional processing of rejected documents when compared to present day endorsements which are stamped on the backs of documents as alluded to earlier herein.

One of the problems associated with the method disclosed in the previous paragraph is that the endorsements which are encoded on the bar or stripe of magnetic material are only machine readable and cannot be read visually by bank personnel. Another problem is that because the bar or stripe of magnetic material is printed at the same time that the rest of the data on the check is printed, any check which is carried in a person's bill fold or purse may become wrinkled or worn. When such a check is processed, incorrect recording and reading of data recorded on the magnetic bar or stripe results.

SUMMARY OF THE INVENTION

In contrast with the methods and apparatuses employed in the prior art, the present invention utilizes a programmable, dot-matrix thermal printer or encoder having a magnetic, thermal-transfer ribbon for printing a bar or stripe of magnetic material on the rear, for example, of each document being processed. The printing of the bar or stripe of magnetic material occurs in real-time-item processing when the document or check is received at a bank for processing for the first time.

In a preferred embodiment of this invention, the apparatus comprises a document track and means for moving said documents sequentially along said document track; said documents having machine readable data thereon including OCR or MICR data; reading means for determining whether or not each said document in said document track has a magnetic stripe thereon, and also for reading data on a said magnetic stripe when said magnetic stripe is present; printing means for printing a magnetic stripe on those of said documents which do not have a magnetic stripe thereon as determined by said first reading means; processing means for processing said documents to obtain data relative to said documents; and writing means for magnetically writing at least a portion of the data obtained from said processing means for a said document onto the associated said magnetic stripe while said document is in said document track; said printing means also being capable of printing data received from said processing means in human readable form as said magnetic stripe is being printed on the associated said document.

In another form, the invention embraces a method of encoding a document in which data to be encoded on the document is entered in a controller, said method comprising the steps of: encoding MICR data on the front side of said document by moving it in operative relationship with a MICR encoder located in a document track; removing said document from said document track after said encoding of MICR data is completed and inverting said document; and re-entering said document in said document track so that the back side of said document faces said MICR encoder to encode endorsement data on said back side.

BRIEF DESCRIPTION OF THE DRAWING

FIG. 6 is a general schematic plan view of a second embodiment of the apparatus of this invention.

DETAIL DESCRIPTION OF THE INVENTION

Figure 1:
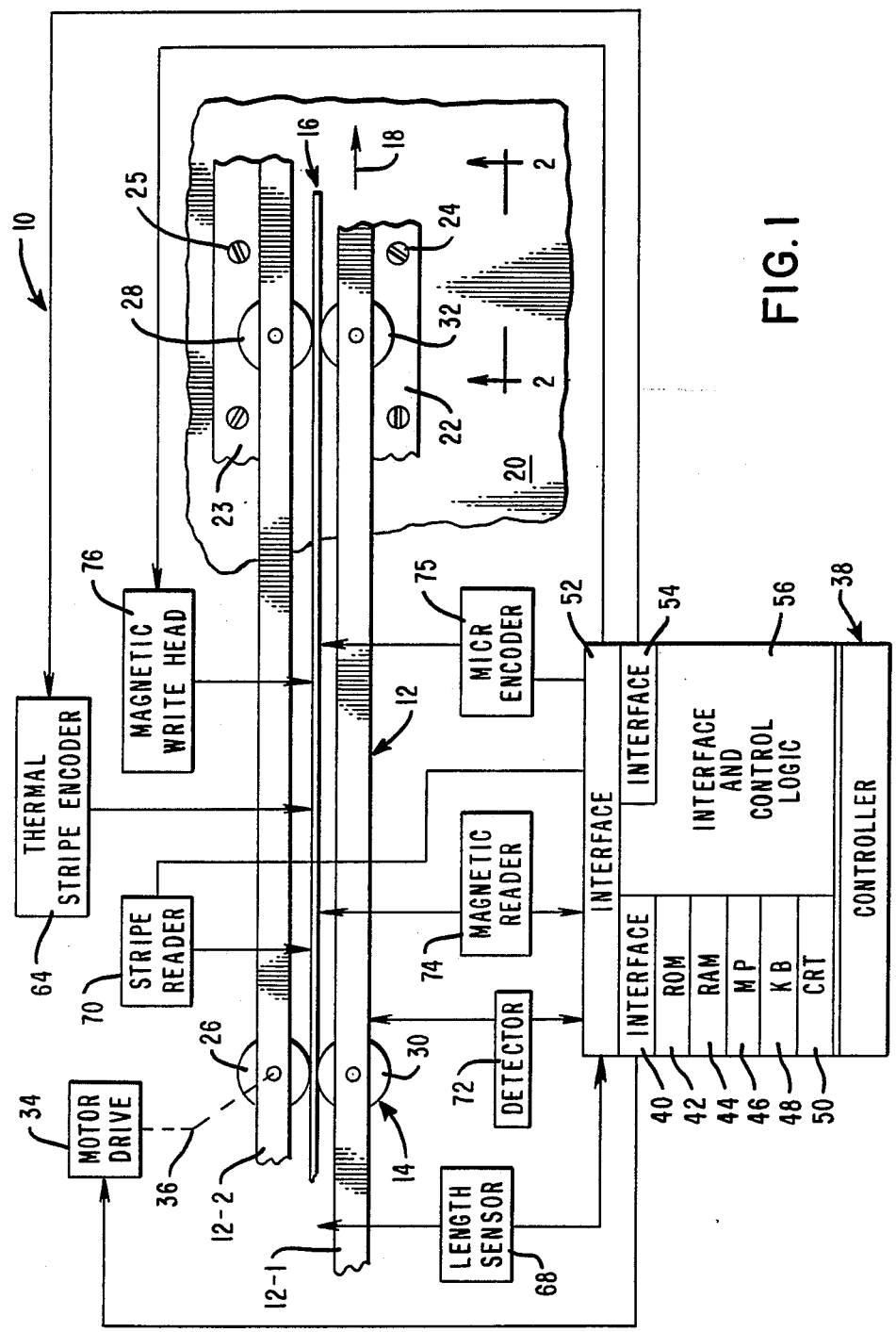
FIG. 1 is a general-schematic, plan view of an apparatus in which a preferred embodiment of this invention resides.

FIG. 1 is a schematic diagram of an apparatus 10 in which a preferred embodiment of this invention is shown. The apparatus 10 includes a document track 12 (only a portion thereof being shown) including means 14 for moving documents 16 serially and in spaced relationship in the document track 12 in the direction of arrow 18. The apparatus 10 may be part of an encoding or proofing machine, for example, which may include sorting pockets (not shown) which are located downstream from arrow 18 and which are not important to an understanding of this invention.

Figure 2:
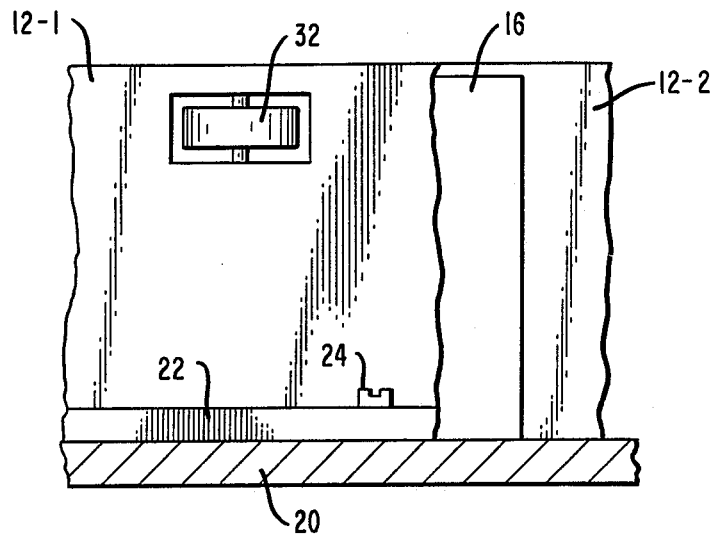
FIG. 2 is a side view, in elevation, of a portion of the document track shown in FIG. 1.

The document track 12 (FIGS. 1 and 2) includes a first wall 12-1 which is upstanding from a base plate 20 and which has a mounting flange 22 to enable the first wall 12-1 to be secured to the base plate 20 by fasteners 24. The document track 12 also includes a second wall 12-2 which is upstanding from the base plate 20 and which has a flange 23 to enable the second wall 12-2 to be secured to the base plate 20 by fasteners 25. The first wall 12-1 and the second wall 12-2 are spaced apart to guide the documents 16 therebetween.

The means 14 for moving the documents 16 along the document track 12 are conventional and include the drive rollers 26 and 28 and their associated pinch rollers 30 and 32, respectively. The drive rollers 26 and 28 are rotated at a constant velocity by a motor drive 34 and conventional pulleys and belts (shown only as dashed line 36 connected to drive roller 26). The motor drive 34 is coupled to the controller 38 through an interface 40 associated with the controller 38.

The actual form of the controller 38 may be different from that shown in FIG. 1; however, the components of the controller 38 are arranged to illustrate their functions. The controller 38 includes: a read only memory (ROM) 42; a random access memory (RAM) 44; a CPU or processor (MP) 46; a keyboard (KB) 48; a display, such as a cathode ray tube (CRT) 50; interfaces 52 and 54; and interface and control logic 56 which provide the appropriate interconnections among the various elements shown to enable the controller 38 to function as an intelligent device or terminal. The program or application programs for running the controller 38 may reside in the ROM 42 or they may be loaded daily into the RAM 44 as is typically done.

Before proceeding further with the discussion of the apparatus 10, it appears useful to discuss some aspects of the document 16 which are pertinent to the apparatus 10. As previously stated, the document 16 used in explaining this invention is a financial document, like a check, although the apparatus 10 may be used with other documents, like valuable coupons, for example.

Figure 3:
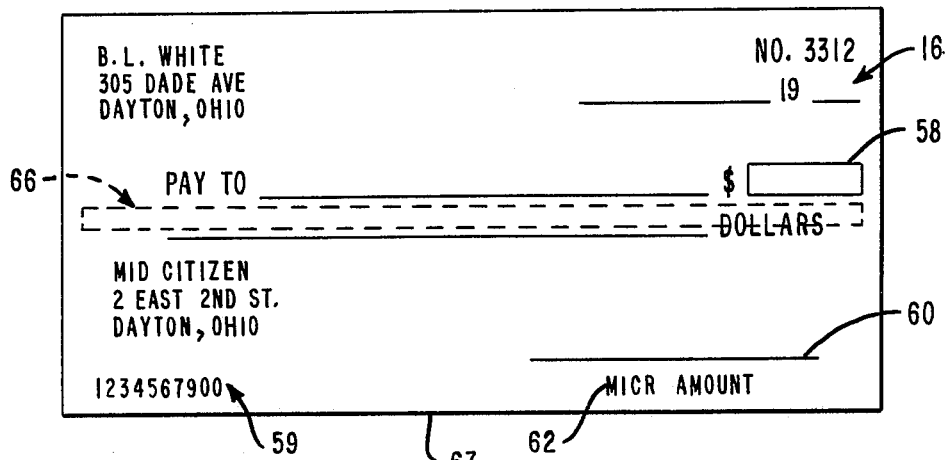
FIG. 3 is a front view of a typical document, like a check, which may be used in the apparatus shown in FIG. 1.

The front side of document 16 is shown in FIG. 3. The document 16 is a typical check which has a box 58 in which the monetary amount is written and it has a line of MICR data printed along line 59. For E-13 B font, for example, all the magnetic characters must be located within a horizontal band which is ¼ inch wide, with the bottom edge of this band being 3/16 inch above and parallel to the bottom of the document or check. The MICR data 59 includes the bank #, check #, and customer account #; no other information may be contained along line 59. When a check is written for use in payment of a debt, for example, the monetary amount is written in box 58, and other data, like payee, payor, etc. are written to make the document a valid financial instrument. When the document is deposited at a bank for payment and processing, the monetary amount of the document along with other data is encoded on the document in MICR ink below the signature line 60, and this encoded data is referred to as MICR data or the MICR amount 62. As stated earlier herein, when the document 16 is processed by a bank, part of the processing procedure performed by the bank is to endorse the back of the document indicating that the bank had processed the document. Each bank which processes a document within the Federal Reserve System in the U.S., for example, similarly endorses a document when processed by it. The endorsements which are printed on the back of a check tend to overlap one another and are difficult to read. In contrast with the methods and apparatuses employed in the prior art, the apparatus 10 utilizes a programmable, dot-matrix, thermal printer or encoder 64 having a magnetic, thermal-transfer ribbon for printing a bar or stripe 66 of magnetic material on the rear of the document 16 in one embodiment as shown in FIG. 3, for example. With the apparatus 10, a lot of information about the processing of the document 16 can be written in the stripe 66 to be mechanically read at a subsequent operation to thereby enhance the processing of financial documents.

Having described the various components of the document 16, it appears appropriate to discuss how the document 16 is processed in the apparatus 10. As a document 16 is moved along the document track 12, a conventional length sensor 68 is utilized to determine the length of the particular document 16 being processed. The output of the length sensor 68 is fed (via the interface 52) to the controller 38 which uses the length to determine the length of the stripe 66 of magnetic material to be encoded on the document 16. It should be noted that the length of checks may vary from about four and one half inches to about nine inches in a typical batch of documents to be processed. By having the length information, the controller 38 can have some control over the length of the stripe 66 of magnetic material to be encoded on the back of the document by the encoder 64 as will be described hereinafter.

As a document 16 is moved along the document track 12 by the moving means 14, it is brought into reading relationship with the length sensor 68 as previously described, and thereafter, it is moved into reading relationship with the stripe reader 70 which determines whether or not a stripe 66 of magnetic material exists on the back of the document. The output of the stripe reader 70 is fed into the controller 38 which stores the data in the RAM 44 to be used by the controller 38 as will be described hereinafter. The apparatus 10 also includes position detectors, like detector 72 which are positioned along the length of the document track 12 to inform the controller 38 of the position of the leading edge, for example, of a document 16 passing therethrough to effect proper, positional relationship with the various components located along the document track 12.

The apparatus 10 also includes a conventional reader 74 which is used to read the MICR monetary amount 62 (if on the document 16 from a prior processing operation) and the MICR data 59 which relates to bank #, account #, etc., as previously described, and this data is forwarded to the RAM 44 of the controller 38 for use by the controller 38. The apparatus 10 also includes a conventional MICR encoder 75 which may be, for example, a thermal encoder which is capable of encoding the monetary or MICR amount 62 of the document 16 in the E-13 B font mentioned earlier herein. Within a batch of documents being processed by the apparatus 10, there, for example, may be some documents which already have the MICR amount 62 thereon while other documents do not have the MICR amount 62 thereon. For these latter ones, an operator reads the courtesy or monetary amount from the document 16 and enters it upon the KB 48. This monetary amount is then fed from the controller 38 at the appropriate time to the MICR encoder 75 which encodes the monetary amount on the document 16. The apparatus 10 also includes a magnetic write head 76 which is used to write data on the magnetic stripe 66 which is printed or encoded by the printer or encoder 64 or by one similar to encoder 64 as done by some other financial institution.

Assume that a batch of documents 16 is to be further processed, and that the documents have not been endorsed by the bank. Assume also, that the MICR monetary amount 62 (FIG. 3) has been encoded on the documents 16 by a conventional MICR thermal encoder. And finally, assume that some of the documents 16 already have a magnetic stripe 66 printed on the backs thereof at some prior operation and that some of the documents 16 do not have any magnetic stripe 66 thereon.

As the documents 16 are moved along the document track 12, they encounter the length sensor 68 which informs the controller 38 of the length of a particular document 16 passing thereby. The stripe reader 70 is positioned in the document track 12 so as to read the magnetic stripe 66 on a document 16 if the stripe 66 is there. The magnetic stripe 66 is printed a fixed, predetermined distance above the bottom edge 67 of the document 16 so as to not interfere with the MICR amount 62, for example. If no stripe 66 is present, this fact is used by the controller 38 to energize the thermal stripe encoder 64 to print a stripe 66 on the document 16. The encoder 64 is conventional and may be one of the types shown in U.S. Pat. No. 4,394,092. The encoders shown in this patent contain a line of 320 resistive heating elements which are arranged in a row to produce a printing matrix having a dot density of 6.06 N dots per millimeter, wherein N is equal to at least one and may be equal to 2 or 3, for example. The ribbon which is used with the encoder contains heat transferable ink. The ink also has the appropriate ingredients therein including the oxide loading to enable the magnetic write head 76 to write effectively in the resulting magnetic stripe 66 which is printed on the document 16. The dot density of the printing matrix mentioned is sufficient to make sure that the stripe 66 is continuous enough through printing successive, adjacent, parallel lines to enable accurate writing into and reading from the resulting magnetic stripe 66. Although a thermal print head having a dot density lower than the one described may be used, such a lower, dot density print head would limit the amount of human readable information which may be encoded along with the magnetic stripe 66.

Continuing with the example being discussed, if no stripe 66 is detected, the thermal stripe encoder 64 will be activated by the controller 38 to encode a magnetic stripe 66 (FIG. 3) on the back of the associated document 16. It should be recalled that the minimum length of a document 16 expected in the system in which the apparatus 10 is used is four and one-half inches long; consequently, the length of the magnetic stripe 66 is a minimum of four inches long. In one embodiment, the magnetic stripe 66 (FIG. 4), while being printed in one continuous stripe, has three sections 66-1, 66-2, and 66-3, for example, associated therewith. Each section, like 66-1, has a pointer section P-1, which informs the controller 38 that data is present in the second section 66-2, when such is the situation. Similarly, the pointer data P-2 is used to inform the controller 38 that data is present in the third section 66-3. Also, the pointer data P-3 could be used to inform the controller 38 that data is present in a new, additional magnetic line (not shown in FIG. 4). Basically, each section, like 66-1, is used to record the data about the bank which processed the document 16. A feature of this invention is that at least some of the data recorded in the first section 66-1, for example, can be printed by the encoder 64 to record such data in human readable form as at area 78 at the time that the stripe 62 is printed. All the usual data about the documents 16 to be processed by the apparatus 10 is available to the controller 38 for printing at the time that the magnetic stripe 66 is printed or encoded in the example being described. As previously mentioned, the associated programs for controlling the operation of the controller 38 may be stored in the ROM 42 or RAM 44, and accordingly, the controller 38 prints the endorsing data about the bank currently processing the document 16 in area 78 at the time that section 66-1 is being printed. If the amount of endorsing data to be printed in human readable form is extensive, a conventional, supplemental printer (not shown) may be positioned at area 78 to print this data. Generally, however, the encoder 64 can print both the magnetic stripe 64 and the human readable data as at area 78. The document 16 is moved further downstream along the document track 12 until it comes into operative engagement with the magnetic write head 76. Continuing with the example being described, because the particular document 16 being described did not have any stripe 66 thereon, the magnetic write head 76 will write the pointer data and the endorsing data into sections P1 and 66-1, respectively, of the stripe 66 as controlled by the controller 38.

Figure 4:
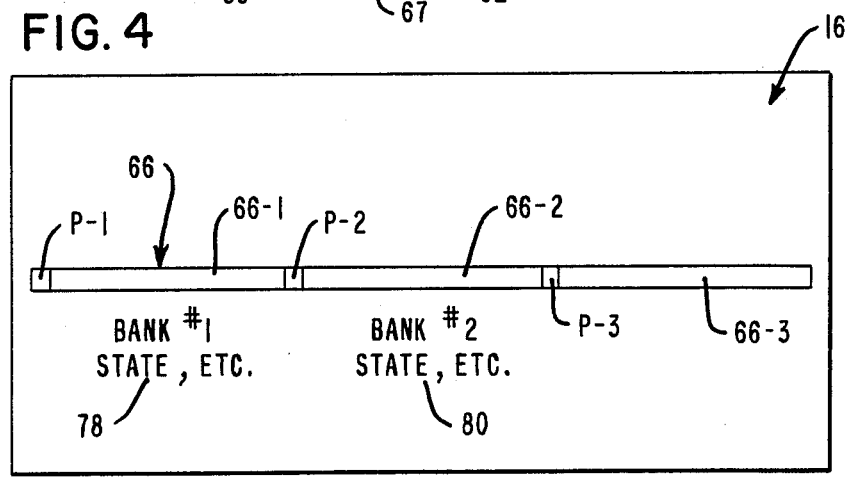
FIG. 4 is a view of the back side of the document shown in FIG. 3.

If the particular document 16 being processed already has a magnetic stripe 66 thereon, then, obviously, another magnetic stripe 66 does not need to be printed thereon. Assume, for example, that the document 16 has already been processed previously on similar apparatus 10 by a bank, and accordingly, endorsement data about that bank will be printed in area 78 (FIG. 4) of the document 16. When this document 16 enters the document track 12, the stripe reader 70 reads the data on the magnetic stripe 66. In this regard, the pointer P-1 indicates that endorsement data exists in section 66-1 and that sections 66-2 and 66-3 are clear to receive data. The controller 38 utilizes this data, and accordingly, it controls the thermal stripe encoder 64 to print the endorsement data in human readable form under section 66-2 as shown at area 80 (FIG. 4). As the document 16 is moved further downstream along the document track 12, the controller 38 energizes the magnetic write head 76 to write the endorsement data for Bank #2 into the section 66-2 of the magnetic stripe 66. While only three sections 66-1, 66-2 and 66-3 are shown in FIG. 4, naturally, a greater number or fewer sections could be utilized if necessary or desirable. The amount of data stored in any one section like 66-1 is a function of the "oxide loading" used in the magnetic ink for printing the magnetic stripe 66 and the writing density of the magnetic write head 76, for example; these can be varied, conventionally, to suit particular applications.

Figure 5:
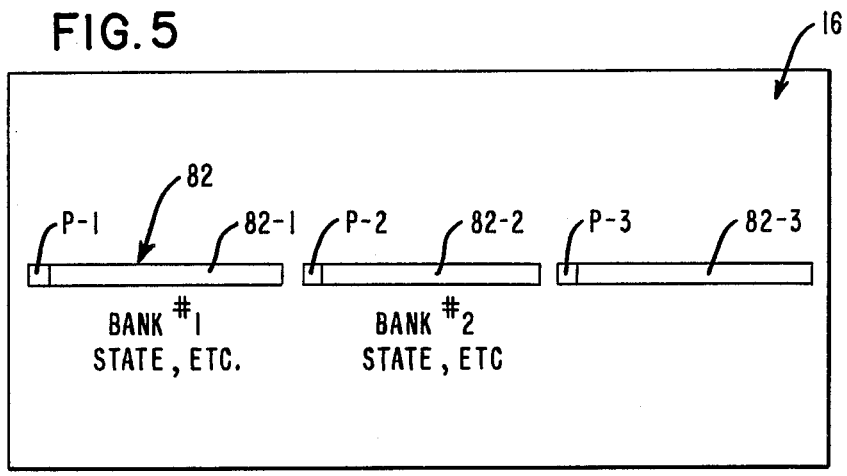
FIG. 5 is a view of the back side of document, showing a second embodiment of the magnetic stripe shown in FIG. 4.

FIG. 5 shows a second embodiment of the magnetic stripe which is designated generally as 82. It is essentially similar to the magnetic stripe 66; however, its associated sections 82-1, 82-2, and 82-3 are divided into discrete sections as shown, with each section having a pointer section P-1, P-2, and P-3, which pointer sections are identical to those shown in FIG. 4. In this embodiment, each financial institution which is to process the documents 16 may utilize its stripe encoder 64 in its apparatus 10 to print the sections, of the magnetic stripe 82 as needed. For example, a first bank may print magnetic stripe 82-1 (FIG. 5), and the second bank to process the document 16 may print the magnetic stripe 82-2.

Figure 7:
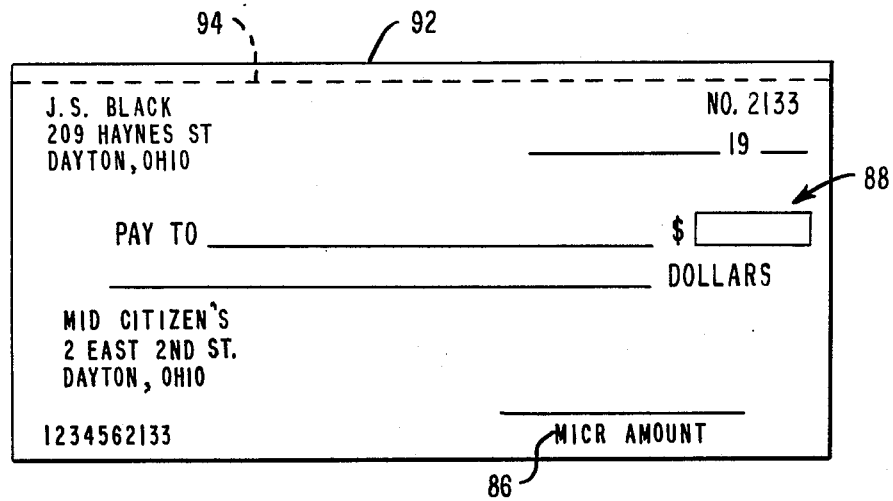
FIG. 7 is a front view of another document used in the system.

FIG. 6 shows a second embodiment of the apparatus of this invention which utilizes an encoder which is used for endorsing the documents, and the apparatus of this embodiment is designated generally as 84. The apparatus 84 includes certain elements which are identical to those shown in FIG. 1; accordingly, identical elements are given the same reference numerals. The apparatus 84 includes a document track 12 and related motor drive 34, a length sensor 68, detector 72, magnetic reader 74, and controller 38. The apparatus 84 also includes a MICR encoder which is used to print or encode the monetary or MICR amount of a check on the check itself as shown at area 86 of check 88 (FIG. 7).

The apparatus 84 (FIG. 6) is essentially a low-cost apparatus in which an operator reads the data from a document, like check 88, and enters the courtesy or monetary amount of the check 88 on the keyboard 48 of the controller 38. When all the data is entered, the operator drops the check 88 into the document track 12, and thereafter, the controller 38 controls the operation of the MICR encoder 90 to print the monetary amount of the check 88 in magnetic ink at area 86 (FIG. 7) of the check 88.

After the MICR amount 86 is encoded on the check 88, the operator of the apparatus 84 simply withdraws the check 88 from the document track 12, inverts the check 88, and inserts the check 88 so that the top edge 92 is placed towards the bottom of the document track 12 and the front of the document 88 is towards the rear of the document track 12. This means that the back of the check 88 faces the MICR encoder 90, and as the check 88 is moved in a downstream direction past the encoder 90, the controller 38 activates the encoder 90 to encode the endorsement data on the rear of the check. The MICR encoder 90 may be of the type shown in U.S. Pat. No. 4,394,092 already alluded to earlier herein. Basically, the encoder 90 is a programmable thermal, dot matrix printer having the dot density previously described. This high density enables printing in E13 B or CMC-7 fonts for the printing of the MICR amount shown in area 86 (FIG. 7), and it also facilitates the printing of endorsement data on the back of the check 88. The endorsement data is shown as printed along a dashed line 94 (FIG. 7). Notice that the printing along dashed line 94 is sufficiently far away from the MICR amount area 86 so as to not interfere with the reading of the MICR amount 86. Another feature is that the endorsement data along dashed line 94 appears at the same distance from the top edge 92 of the check 88 regardless of the particular width or height of the check being processed.

What is claimed is:

1. An apparatus for processing documents comprising:
    a document track and means for moving said documents sequentially along said document track; said documents having machine readable data thereon;
    processing means for processing said documents to obtain data relative to said documents and also for controlling the operation of said apparatus;
    reading means coupled to said processing means for determining whether or not each said document in said document track has a magnetic stripe thereon, and also for reading data on a said magnetic stripe when said magnetic stripe is present;
    printing means coupled to said processing means for printing a magnetic stripe on those of said documents which do not have a magnetic stripe thereon as determined by said first reading means;
    writing means coupled to said processing means for magnetically writing at least a portion of the data obtained from said processing means for a said document onto the associated said magnetic stripe while said document is in said document track;
    said printing means also being capable of printing data received from said processing means in human readable form as said magnetic stripe is being printed on the associated said document.

2. The apparatus as claimed in claim 1 in which said printing means includes a printing unit comprised of a line of resistive heating elements arranged in a row to produce a printed dot density of at least 6.06 dots per millimeter, and also includes a ribbon containing heat transferable magnetic ink. area reserved for pointer data.

3. The apparatus as claimed in claim 2 in which said documents have MICR data thereon and in which said printing means is positioned along said document track so as to print said magnetic stripe on said documents at a location away from said MICR data.

4. The apparatus as claimed in claim 3 in which said printing means is positioned along said document track so as to print both said magnetic stripe and said data in human readable form on the backs of said documents.

5. The apparatus as claimed in claim 4 in which said printing means includes a sensing means coupled to said processing means for sensing the length of said documents, said length being used by said processing means to control the length of said magnetic stripe being printed by said printing means on a particular said document.

6. The apparatus as claimed in claim 5 in which said magnetic stripe is continuous and includes sections for writing in pointer data.

7. The apparatus as claimed in claim 5 in which said magnetic stripe is printed in discrete sections with each said discrete section having an area reserved for pointer data.

8. A method of encoding a document in which data to be encoded on the document is entered in a controller, said method comprising the steps of:
    encoding MICR data on the front side near the bottom edge of said document by moving it in operative relationship with a MICR encoder located in a document track;
    removing said document from said document track after said encoding of MICR data is completed and inverting said document; and re-entering said document in said document track so that the back side of said document faces said MICR encoder to encode endorsement data with said MICR encoder on said back side near the top edge of said document.

* * * * *

UNITED STATES PATENT AND TRADEMARK OFFICE
CERTIFICATE OF CORRECTION

PATENT NO. : 4,731,524
DATED : March 15, 1988
INVENTOR(S) : Ralf M. Brooks

It is certified that error appears in the above—identified patent and that said Letters Patent is hereby corrected as shown below:

Column 8, line 33, delete "area reserved for pointer".

Column 8, line 34, delete "data".

Signed and Sealed this

Twenty-sixth Day of July, 1988

Attest:

DONALD J. QUIGG

*Attesting Officer*     *Commissioner of Patents and Trademarks*